Dec. 4, 1962     R. DU CHAFFAUT     3,067,017
UTILIZATION CIRCUIT FOR CATALYTIC FURNACES
Filed Aug. 1, 1958     2 Sheets-Sheet 1

INVENTOR
ROGER DU CHAFFAUT
BY
Mead, Browne, Schuyler & Beveridge
ATTORNEYS

INVENTOR
ROGER DU CHAFFAUT

United States Patent Office 3,067,017
Patented Dec. 4, 1962

3,067,017
UTILIZATION CIRCUIT FOR CATALYTIC
FURNACES
Roger du Chaffaut, Douai, France, assignor to Societe
Chimique de la Grande Paroisse ("Azote & Produits
Chimiques"), Paris, France, a corporation of France
Filed Aug. 1, 1958, Ser. No. 752,641
Claims priority, application France Aug. 29, 1957
2 Claims. (Cl. 23—277)

Arrangements for recovering in the form of steam the reaction heat produced by syntheses under a raised temperature such as the synthesis of ammonia are already known.

Most of these arrangements resort to the circulation in contact with the reacting gases or with the gases which are to react, of a fluid the heat contained in which is subsequently used in an external boiler with a view to producing steam.

This solution allows uniformizing the reaction temperature, but it is intricate and requires the circulation of an intermediate fluid and leads to substantial losses of heat, whereby a valuable room is lost inside the chamber in which the catalytic reaction is performed under pressure.

It is well known, furthermore, and since a long time, and this has been proved by various industrial applications that it is possible to uniformize perfectly the reaction temperature by means of the gases which are adapted to react by resorting to heat exchanging surfaces which are suitably designed for this purpose between the reacting gases and the fresh gases and by resorting also to auxiliary inputs of cold gases at suitable points.

Now, the present invention has for its object the recovery of the heat with a maximum efficiency without resorting to an intermediate fluid, while ensuring a perfect uniformity of the reaction temperature. To this end, it consists chiefly in applying at least one of the following arrangements:

The hot gases subjected to a high pressure feeding the heat-recovering means flow inside a pipe which is, in its turn, surrounded by the gases subjected to the same high pressure, passing out of the boiler and cooled at their output from the boiler, so that their temperature may be consistent with the use of metals of a conventional ordinary grade which are to resist merely the action of pressure.

The catalytic means adapted to improve the heat evolved by reaction is housed inside a chamber having a cold wall and equipped with a series of heat-insulating screens between which fluids which are hotter and hotter flow from the outside into the innermost reaction area.

The hot gases passing out of the reaction furnace are fed into the recovering means through a pipe which is surrounded coaxially by a further pipe which is much less hot and inside which gases under pressure flow after passing out of the boiler or the like recovering apparatus.

The gases which are partly cooled are returned into the pressure-resisting chamber inside which they flow through a series of heat-exchanging elements arranged coaxially with and outside the axially extending reaction chamber.

Coaxial heat insulating screens cut out any losses of heat and the fresh gas entering said chamber flows along the walls of the pressure chamber so as to maintain them at a cold temperature.

The gases to be transformed which have been heated inside said heat exchanger flow then through further heat exchangers housed inside the actual reaction chamber inside which they are heated up to the threshold at which the reaction is initiated through contact with the wall along which the reacting gases flow.

The area of the heat-exchanging surface between the reacting gases and the gases fed into the reaction chamber is defined in a manner such that at the output of the reaction chamber, the gases are cooled down to a temperature approximating the threshold of activity of the reaction, which is particularly favorable for the shifting of the equilibrium into the vicinity of the point corresponding to maximum contents of the synthetic product to be obtained.

The output temperature of the reaction chamber is adjusted through adjustment of the pressure of steam in the heat recovering boiler.

It is also possible to adjust, through a valve adapted to act on a by-pass, on the throughput of gases directed towards the boiler or the like recovering apparatus.

Further objects and features of the invention will appear in the reading of the following description of a preferred embodiment of the invention, illustrated in the accompanying drawings, by way of example and by no means in a limiting sense.

Figure 1:
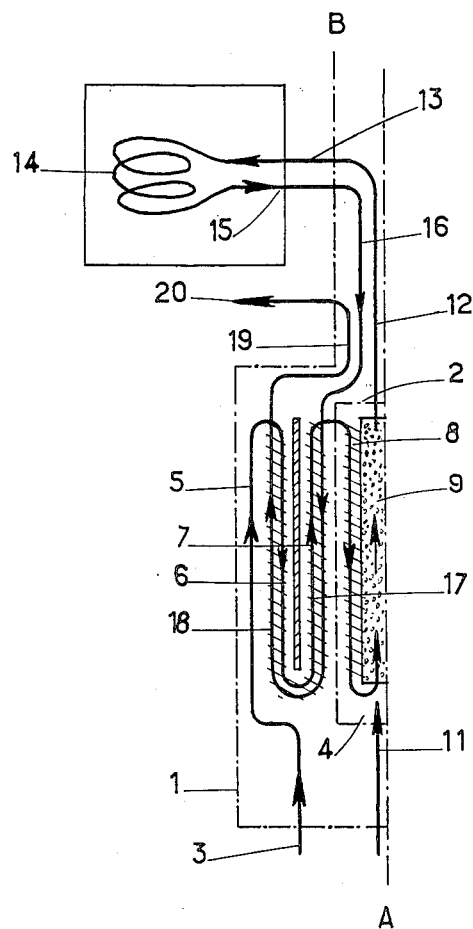
FIG. 1 is a diagram showing the circuit provided for the gases in an arrangement according to the invention, assumed to serve, for instance, for the production of ammonia.

In FIG. 1, the furnace is constituted by a cylindrical furnace the axis of which is shown at AB, only the left-hand side of the furnace being illustrated in a diagrammatic manner, and the right-hand side being omitted.

The outer casing of the furnace is illustrated by the dot-and-dash line 1 and the inside of the actual catalytic system is bounded by the dot-and-dash line 2. The gases under pressure and at a low temperature enter the furnace at 3 and they are guided in the direction of the arrows. They flow through a series of coaxial areas which lead them gradually into the inside of the actual catalytic system; they enter thus first the area 5 located on the outside of the furnace arrangement and, consequently, the wall of the furnace remains subjected to a comparatively low temperature.

They enter then the next inner areas 6 and 7 housed inside a heat exchanger where they are heated through indirect contact with the reaction gases fed by the heat-recovering apparatus, as disclosed hereinafter.

The gases thus heated enter then at 8 the actual furnace where they are heated still further through indirect contact with the gases flowing at 9, inside the exothermic catalytic area. The gases at 8 sweep to this end over the catalytic chamber before they enter the latter at 9; if required, a direct introduction of fresh gases may be obtained at 11 as well known per se, with a view to perfecting the adjustment of the temperature at the input into the catalytic chamber and inside the latter.

The gases pass out of the catalytic chamber at 12 into the coaxial central section 2 of the furnace, after which they are directed laterally as they pass out of the catalytic synthesis furnace at 13 and enter the heat-recovering apparatus 14 constituted by a boiler. At the output end of said boiler where their temperature has sunk by a predetermined amount, they are removed, as shown at 15, and flow back at 16 on the outside of the outlet 12 of the catalytic chamber. Thence, they reach at points 17 and 18 the heat exchanger where they are cooled in contact with the fresh gases entering along the path 6—7. In the diagram of FIG. 1, the areas of indirect heat exchange are shown by hatchings.

At the output end of the heat exchanger, at 19, the gases are exhausted as shown at 20, on the outside of the pipe 16.

It is thus apparent that the gases to be subjected to reaction are gradually heated up to temperature of reaction firstly in the heat exchanger 6—7, 17—18 and then at 8 in contact with the gases undergoing a catalytic reaction. The hot gases pass out of the furnace at 12 at the temperature at which it is best suited for bringing the catalytic reaction to completion and they supply their thermal energy to the boiler 14 after which the gases passing out of the said boiler are again cooled inside the heat exchanger 6—7, 17—18 before they are exhausted.

This provides a methodical heating of the gases before reaction and also a methodical cooling of said gases after reaction and after recovery of their thermal energy inside the boiler or the like heat-recovering apparatus.

Figure 2:
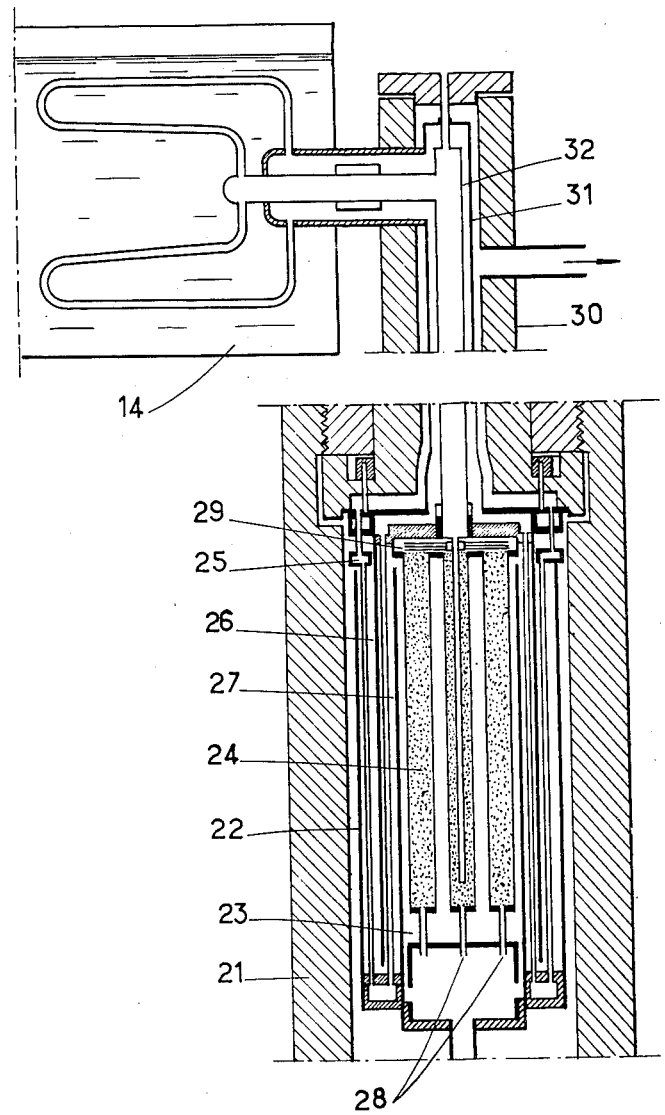
FIG. 2 is a cross-section of the main elements of a furnace operating in accordance with the diagram of FIG. 1.

In FIG. 2, 21 designates the outer wall of the lower section of the furnace illustrated diagrammatically at 1 in FIG. 1. Similarly, 22 designates the heat exchanger illustrated diagrammatically at 6—7, 17—18 in FIGS. 1 and 23, the chamber of the furnace in which the bundle of catalytic tubes 24 is arranged as diagrammatically shown at 9 in FIG. 1.

The fresh gases flow between the inner surface of the wall 21 and the outer surface of the heat exchanger 22. They enter then at 25 said heat exchanger which forms a double heat exchanger including, for instance, two coaxial heat exchanging elements 26 and 27 separated by a heat insulation. Said double heat exchanger surrounds entirely the heat insulated cylinder inside which is housed the tubular catalytic bundle 24.

The preheated gases enter said cylinder and sweep outwardly as mentioned precedingly over said bundle 24 before entering same through the ports 28, which ensures thus a further and efficient exchange of heat. The bundle 24 includes, to this end, a number of tubes which allow obtaining the area which is just necessary for ensuring the desired exchange of heat.

Partial admissions of fresh gases at different heights inside this novel heat exchanger or at one end thereof allow adjusting accurately the exchanges of heat at different points.

The gases which are to react being thus heated enter then, as already mentioned, the catalyst inside the tubular bundle 24 through the ports 28; they react therein and their temperature increases. At the output end of the tubular bundle, at 29, the gases are sent directly, as already mentioned, into the boiler located outside the furnace. To this end, the upper portion of the reaction chamber includes an outer wall 30 inside which are arranged two coaxial pipes 31 and 32, the gases entering the boiler through the inner pipe 32.

After abandoning the heat conveyed by them and being cooled down to a temperature depending on the area of the heat exchanging surface of the bundle 24 and on the pressure of the boiler, the cooled gases are reintroduced into the synthesis furnace through the space comprised between the pipes 31 and 32, coaxially with the output pipe 32. The pipe 31 may be inwardly heat insulated and the pipe 32 may be outwardly heat insulated, so that the metal walls of the pipes 31 and 32 may be substantially at the same temperature and are subjected with reference to each other only to a very low difference in heat expansion.

The gases are then fed into the double heat exchanger 26—27 inside which they flow, while they are being cooled, between the inner heat exchanger and the outer heat exchanger out of which latter they flow into the space comprised between the pipe 31 and the outer wall 30, coaxially with the return pipe passing out of the boiler 14, which space is heat insulated outwardly.

The heat exchanger may include bundles of rectilinear tubes or else one or more spirally wound tubes or any other suitable arrangement. The heat exchanger being provided on the outside of the chamber containing the catalyst, this allows giving the latter a considerable length and a large area which leads to an improved efficiency of the thermal recovery.

The arrangement of the two elementary heat exchangers arranged coaxially and separated by an insulation allows reducing to very large extent the losses of heat and provides complete freedom of expansion for all the parts of said exchanger.

The boiler may be set directly on the member closing the chamber in which the synthesis is performed, which reduces to a minimum all the losses.

A raising of the operative pressure in the boiler leads to a raising of the temperatures of the gases and, consequently, to a raising of the temperature at the output end of the heat exchanger 26—27 facing the catalytic chamber 24. By maintaining the latter at a temperature of about 200-220° C., it is possible to obtain at 29, at the output end of the catalytic synthesis tubes, temperatures of the order of about 450-470° C. which are particularly advantageous with a view to obtaining high contents of ammonia in the gases passing out of the catalytic tubes.

A similar increase in the temperature of the gases at the output end 26—27 may be obtained through an adjustable shunting of the gases feeding the boiler or the like recovering apparatus.

The gases which have reacted and which have been properly cooled in the heat exchangers maintain a low temperature for the parts which are subjected to the full pressure developed by the synthesis and, consequently, said parts may be reliably executed with steels of a conventional ordinary grade. The synthesis furnace itself is also made of an ordinary steel grade.

A number of sliding joints is required between the different parts of the circuit afforded for the gases with a view to ensuring their free expansion, but all these sliding connections are subjected only to the small difference in pressure due to the losses of head arising for various reasons in the different circuits and they are readily executed, most of said joints being preferably of the autoclave type.

In the arrangement described, the boiler may operate at such temperatures and pressures which may be desired, without this leading to any technical difficulty in the execution of the synthesis producing furnace.

What I claim is:

1. A utilization circuit for the hot gases produced by a furnace operating catalytic syntheses under a high pressure and including a catalytic reaction chamber, an inner heat exchanger surrounding said chamber, an outer heat exchanger surrounding the inner heat exchanger, a casing having a wall enclosing the heat exchangers and chamber, means feeding the gases to be treated into the reaction chamber through the outer and inner heat exchangers in succession, said utilization circuit comprising a boiler carried by said casing, a heating pipe having two ends lying inside the boiler, a first pipe extending through the casing wall and connecting unrestrictedly the output of the reaction chamber with one end of said heating pipe, a second pipe surrounding coaxially the first pipe, connected unrestrictedly with the other end of said heating pipe and extending through the casing wall to feed the gases cooled in the heating pipe into the atmosphere through the inner and outer heat exchangers in succession in countercurrent relationship with the gases to be treated.

2. A utilization circuit for the hot gases produced by a furnace operating catalytic syntheses under a high pressure and including a catalytic reaction chamber, an inner heat exchanger surrounding said chamber, an outer heat-exchanger surrounding the inner heat exchanger, a casing having a wall enclosing the heat exchangers and chamber, means feeding the gases to be treated into the reaction chamber through the outer and inner heat exchangers in succession, said utilization circuit comprising a boiler carried by said casing, a heating pipe having two ends lying inside the boiler, a first pipe extending through the casing wall and connecting unrestrictedly the output of the reaction chamber with one end of said heating pipe, a second pipe surrounding coaxially the first pipe, connected unrestrictedly with the other end of said heating pipe and extending through the casing wall to feed the gases cooled in the heating pipe through the inner and outer heat exchangers in succession in countercurrent relationship with the gases to be treated, and a tubular wall surrounding the second pipe and defining with the latter an annular channel opening into the atmosphere and through which the gases passing out of the second pipe and passing through the heat exchangers escape into the atmosphere.

References Cited in the file of this patent

UNITED STATES PATENTS

| | | |
|---|---|---|
| 1,202,995 | Haber et al. | Oct. 31, 1916 |
| 1,845,050 | Lantz et al. | Feb. 16, 1932 |
| 2,032,652 | Du Chaffaut | Mar. 3, 1936 |
| 2,898,183 | Fauser | Aug. 4, 1959 |